Patented Sept. 7, 1943

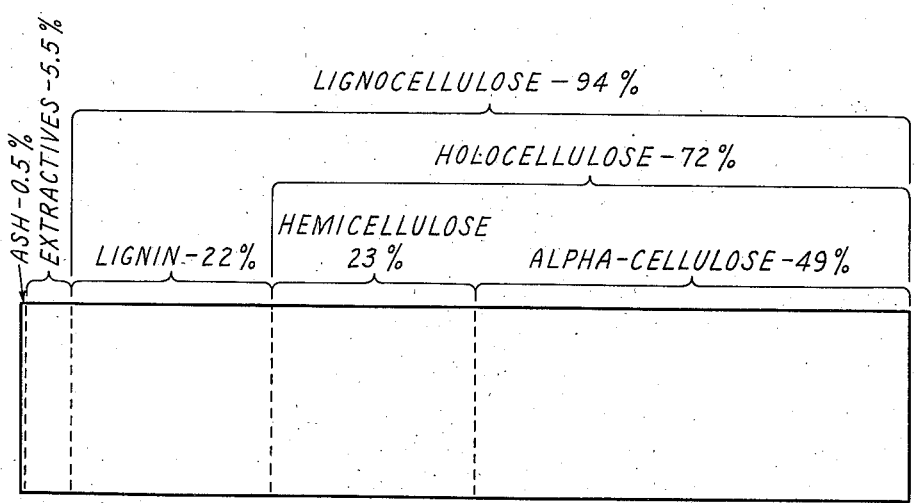
CHEMICAL COMPOSITION OF HARDWOODS
INVENTORS.
EARL C. SHERRARD
ELWIN E. HARRIS
BY
ATTORNEY.

2,328,749

UNITED STATES PATENT OFFICE 2,328,749

PROCESS FOR SIMULTANEOUSLY MANUFACTURING PULP AND HYDROGENATED PRODUCTS FROM LIGNOCELLULOSE

Earl C. Sherrard and Elwin E. Harris, Madison, Wis., assignors to Henry A. Wallace as Secretary of Agriculture of the United States of America, and to his successors in office Application July 15, 1939, Serial No. 284,751

1 Claim. (Cl. 92—9)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to a process for the manufacture of cellulose or pulp by the removal of lignin and hemicellulose from the lignocellulose of wood or other plant products by catalytic hydrogenation.

The process is directed toward the simultaneous manufacture of pulp or cellulose and the conversion by hydrogenation of lignin and hemicellulosic constituents of lignocellulose into useful products, by treating a suspension of chipped, shredded, or comminuted plant materials in an aqueous medium, with hydrogen at elevated temperatures and pressures, and in the presence of a catalyst, such as, for example, nickel, palladium, platinum, molybdenum, tungsten, or derivatives of other elements of periodic group 8.

The principal object of our invention is the simultaneous manufacture of pulp or cellulose and the converting of lignin and hemicellulosic constituents of lignocellulosic material into useful products, during the pulping process.

Another object of our invention is to manufacture pulp or cellulose, by treating the plant materials with hydrogen in an aqueous medium, thereby converting lignin and the hemicellulosic constituents thereof, into hydrogenated products, which may be readily separated from the pulp.

Still another object of our invention is the conversion of the lignin and/or the hemicellulosic material into useful products, by hydrogenation in an aqueous medium.

Still another object of our invention is to control the conditions of the reaction, so as to retain in the cellulosic fraction, the desired amount of hemicellulosic material, thereby obtaining a pulp fiber of desired composition.

Still another object of our invention is to hydrogenate any extractive materials, such as, for example, resins, fats, terpenes, waxes, etc., associated with lignocellulose that are susceptible to hydrogenation under the conditions of our process.

Other objects will appear from the following description of the embodiments of our invention.

In considering the reactions involved in our invention, we prefer to consider lignocellulose as having a chemical composition substantially as illustrated by the attached drawing which pertains to the composition of hardwoods. We recognize that the composition of softwood, or other plant material, will differ somewhat from hardwood in the relative proportions of cellulose, hemicellulose, and lignin. We also recognize certain differences in the chemical nature of lignin and hemicellulose in hardwoods, softwoods, and other plant materials.

Lignin is generally understood as a cementing material that binds the cellulose fibers together in plant materials. It may be regarded as being associated in physical combination, or in chemical combination, with the hemicellulose, α-cellulose, or both, in any lignocellulose complex. We prefer to regard it, for the purposes of our invention, as chemically combined, as illustrated in the hereinbefore mentioned drawing. The chemical combination of lignin may be with the hemicellulose, the α-cellulose, or both. A chemical combination may exist between hemicellulose and α-cellulose. We also recognize the presence of uronic acids in hemicellulose, in both loose and firm combination, with a complex composed of pentose and hexose sugars.

It is the purpose of our present invention to progressively remove the lignin and hemicellulose from the α-cellulose by converting them into hydrogenated products during the pulping process.

Our process differs from well-known pulping processes, which depend on the solution of lignin in the form of soluble derivatives, in that we employ hydrogen under pressure to directly convert the lignin and hemicellulose in lignocellulose into n-propylcyclohexane, n-propylcyclohexyl derivatives, acids, alcohols and glycols, all of which may be recovered during or at the end of the pulping process, thus eliminating and overcoming difficulties now encountered in the disposal of pulp waste liquors. While our invention is directed to the production of pulp, by converting lignin and hemicellulose into hydrogenated products, we do not limit ourselves to the hydrogenation of these components alone, but we may elect to regulate our process so as to convert a desired amount of the α-cellulose into hydrogenated products. Also, when a wood having a high extractive content is used, we propose to simultaneously hydrogenate all of the constituents susceptible to hydrogenation, such as resins, terpenes, fats, waxes, etc.

The subject matter of our invention thus falls into two parts; first, the winding of the fiber in the form of pulp, and, secondly, the conversion and recovery of the noncellulosic material in the form of useful products.

We have found that by controlling the time, and/or the pH of the liquors, and/or the pressure, and/or the temperature, the progress of the pulping may be regulated, thus allowing the removal of part or all of the lignin, or, if desired, all of the lignin and part of the hemicellulose, and by so doing, causing the pulp to be composed of a mixture of hemicellulose and α-cellulose, or of α-cellulose, alone.

The following may be stated as a general outline of procedure, including features some of which may be at times omitted or replaced by others.

*Example 1.*—Suspend approximately 200 grams of subdivided plant material, such as, for example, wood, bagasse, etc., in approximately 1 liter of water containing substantially 10 grams of an alkali, such as, sodium hydroxide; place in a 2-liter bomb with substantially 10 grams of a suitable catalyst, such as, for example, nickel, tungsten, etc.; introduce hydrogen at substantially 2,000 pounds per square inch pressure at room temperature; and then heat at substantially 225° C., the while agitating the mixture until the desired amount of hydrogen has been absorbed.

*Example 2.*—Suspend approximately 200 grams of subdivided plant material, such as, for example, wood, bagasse, etc., in approximately 1 liter of water containing from 15 to 100 grams of an alkali, such as sodium hydroxide; place in a 2-liter bomb with a suitable catalyst, such as, for example, nickel, molybdenum, etc.; introduce hydrogen at pressures ranging from 1,500 to 3,500 pounds per square inch at room temperature; and then heat at 150° C. to 250° C., the while agitating the mixture until the desired amount of hydrogen has been absorbed.

*Example 3.*—Suspend approximately 200 grams of subdivided plant material, such as, for example, wood, bagasse, etc., in approximately 1 liter of water; place in a 2-liter bomb with a suitable catalyst that is capable of retaining its activity in an acidic medium, such as, for example, the metals of periodic group 8, or their derivatives; introduce hydrogen at substantially 2,000 pounds per square inch pressure at room temperature; and then heat at 150° C. to 250° C., the while agitating the mixture until the desired amount of hydrogen has been absorbed.

The products of the reactions, as illustrated by the foregoing examples, are a fibrous pulp and a mixture of substantially colorless, oily and water-soluble products. We may recover the pulp by any well-known method. We may recover the oily products either by extraction, distillation, or both. The water-soluble products may be recovered by precipitation, distillation, or extraction.

While the foregoing examples are illustrative of batch technique, it is to be understood that our invention may also be practiced, under commercial conditions, as a continuous process, under pressure in tubes or cylinders, by the introduction of hydrogen against a counter flow of an aqueous suspension of subdivided plant materials.

It is to be understood that we do not limit ourselves to any given gas pressure during the hydrogenation reaction. We prefer to allow the reacting gas pressure to be governed by the initial gas pressure, and at a chosen temperature. We have, by our examples, shown what we consider to be the optimum temperatures and pressures. We recommend temperatures below 300° C. in order to avoid thermal decomposition of the lignocellulose, but it is to be understood that we do not wish to limit ourselves to temperatures below 300° C., provided conditions are employed that will avoid thermal decomposition of the lignocellulose.

By the expressions, suitable catalyst, elevated pressures, and aqueous medium, appearing in our appended claims, we mean that the catalyst may be nickel, palladium, platinum, molybdenum, tungsten, or derivatives of other elements in periodic group 8; and, elevated pressures, pressures ranging initially from 1,500 to 3,000 pounds per square inch at room temperature, and that during the reaction will correspond to pressures relatively ranging from 3,000 to 6,000 pounds, depending upon the temperature employed; and, aqueous medium to include both neutral and alkaline solutions.

Having thus described our invention, what we claim for Letters Patent is:

A process comprising heating at a temperature above about 150° C. and below 225° C. under a pressure of 3,000 to 6,000 pounds per square inch, a lignocellulosic material in an aqueous sodium hydroxide medium in an amount equivalent to 10 to 100 parts of sodium hydroxide for each 200 parts of the lignocellulosic material, with a lignin hydrogenation catalyst chosen from the group consisting of molybdenum, tungsten, and derivatives of the elements of periodic group 8, and in an atmosphere of hydrogen substantially free of oxygen until the lignin component of the lignocellulosic material is hydrogenated, but the cellulose component is substantially unchanged, the hydrogenated lignin being thereby converted into cleavage products which form a solution with the aqueous alkaline medium, thence separating the cleavage products from the fibrous material consisting essentially of cellulose, and recovering the solution of cleavage products and the fibrous material separately.

EARL C. SHERRARD.
ELWIN E. HARRIS.